(12) United States Patent
Secord

(10) Patent No.: US 9,323,137 B1
(45) Date of Patent: Apr. 26, 2016

(54) VEHICULAR ILLUMINATING SYSTEM AND DISPLAY DEVICE FOR USE DURING CLEANSING

(71) Applicant: Patrick Secord, Orlando, FL (US)

(72) Inventor: Patrick Secord, Orlando, FL (US)

( * ) Notice: Subject to any disclaimer, the term of this patent is extended or adjusted under 35 U.S.C. 154(b) by 328 days.

(21) Appl. No.: 14/024,052

(22) Filed: Sep. 11, 2013

Related U.S. Application Data

(60) Provisional application No. 61/700,163, filed on Sep. 12, 2012.

(51) Int. Cl.
*G03B 21/14* (2006.01)
*F21S 10/00* (2006.01)

(52) U.S. Cl.
CPC .............. *G03B 21/14* (2013.01); *F21S 10/00* (2013.01); *G03B 21/145* (2013.01)

(58) Field of Classification Search
CPC ...... G03B 21/145; G03B 21/28; G03B 15/02; F16M 11/10; B44D 3/00
USPC ............ 353/12, 13, 119, 39, 4; 362/459, 503, 362/523, 382
See application file for complete search history.

(56) References Cited

U.S. PATENT DOCUMENTS

| | | | | |
|---|---|---|---|---|
| 1,656,110 | A * | 1/1928 | Foltis | G09F 19/18 353/119 |
| 4,217,047 | A * | 8/1980 | Jacksen | G03B 15/02 353/28 |
| 5,477,283 | A * | 12/1995 | Casey | B44D 3/00 353/42 |
| 5,519,536 | A | 5/1996 | Hoehn | |
| 6,750,832 | B1 | 6/2004 | Kleinschmidt | |
| 6,870,670 | B2 | 3/2005 | Gehring et al. | |
| 7,133,022 | B2 | 11/2006 | Grabert | |
| 7,175,321 | B1 * | 2/2007 | Lopez | B60Q 1/50 296/21 |
| 7,355,796 | B2 | 4/2008 | Robinson | |
| 7,526,103 | B2 | 4/2009 | Schofield et al. | |
| 7,629,946 | B2 | 12/2009 | Nagata | |
| 7,655,895 | B2 | 2/2010 | Breed | |
| 7,949,152 | B2 | 5/2011 | Schofield et al. | |
| 2007/0076177 | A1 * | 4/2007 | Vitantonio | F16M 11/10 353/99 |
| 2014/0204347 | A1 * | 7/2014 | Murphy | G03B 21/145 353/57 |

* cited by examiner

*Primary Examiner* — William C Dowling
(74) *Attorney, Agent, or Firm* — H. John Rizvi; Gold & Rizvi, P.A

(57) ABSTRACT

There is provided a system and method for illuminating a windshield of a vehicle during a carwash. The system has a vehicle illuminating display device and an applicator for applying a reflective or absorptive material to the windshield of the car. The display device include a mask or template of an image to be displayed on the windshield and a light assembly for passing rays of light through and around the template. The method has the steps of moving the car into position and then applying a substance, such as a wax or soap, to the surface of the windshield. The targeted vehicle's windshield is then illuminated through the use of either LED or incandescent lighting to thereby project an image corresponding to the template onto the windshield.

9 Claims, 6 Drawing Sheets

VEHICULAR ILLUMINATING SYSTEM AND DISPLAY DEVICE FOR USE DURING CLEANSING

CROSS-REFERENCE TO RELATED APPLICATION

This Non-Provisional Utility application claims the benefit of U.S. Provisional Patent Application Ser. No. 61/700,163, filed on Sep. 12, 2012, which is incorporated herein in its entirety.

FIELD OF THE INVENTION

The present invention relates to a vehicular illuminating display device and method of use and, more particularly, to a vehicle illuminating display device for and system for use during the cleansing of a vehicle that enables a user to visually recognize advertisements through the vehicle windshield and windows while the car is being treated.

BACKGROUND OF THE INVENTION

As in every industry, advertising and marketing play a key role in customer development and loyalty. The car washing industry is no different in its need to convey information to the customer. Car wash establishments generally use either a conveyor type or non-conveyor type of car wash. The conveyor type involves the use of a mechanism that moves the automobile forward inside of a controlled washing space whilst its cousin, the non-conveyor type does not have such a device. It relies on the driver moving the car or the washing equipment moving over a stationary car. In either a conveyor or non-conveyor type, there exists a need for a foam, wax or soap application device to cleanse and polish the vehicle.

These car washing soap, foam or wax application devices are typically mounted directly above the vehicle windshield. The soap, foam or wax is applied to the surface of the windshield whether in the conveyor or the non-conveyor type. In either type of car wash, the chance to offer clients new opportunities or engage them with new services enhances user experience and business reputation. In the car wash industry, there is a known existing solution for communications that attempt to garner a user's attention.

Typically, a back lit sign box conveys messages to customers in the hopes of providing advertising and promotional space. However, this system has been shown to be ineffective in that it tries to command a user's attention without clearly displaying the aforementioned messages. This is because one of the many problems with this form of communication is that while receiving a car wash, the customer's ability to clearly view the environment outside of the vehicular window is limited by either soap, cleansing chemicals or equipment. Another disadvantage to the existing communications method is that changing the message is cumbersome and costly.

Accordingly, there remains a need to permit a car washing business to clearly and effectively communicate advertising, promotional and other messages to the customer while the customer's vision is impaired by the effect of a soapy windshield. Additionally, a user must be able to inexpensively and easily change the message being conveyed to the driver or occupant of the car.

SUMMARY OF THE INVENTION

The present invention overcomes the deficiencies of the known art and the problems that remain unsolved by providing a system and method for projecting an image onto substances on the surface of a vehicular windshield.

In accordance with one embodiment of the present invention, there is disclosed a vehicle illuminating display device for use within a car washing establishment including a light source assembly and a gobo assembly including a gobo template comprising an image and a gobo template holder adapted to secure the gobo template within the gobo assembly. An extension member is affixed to the light source assembly and supports the gobo assembly at a predetermined distance from the light source assembly. The vehicle illuminating display device additionally includes a support mount for supporting the combined light source assembly, gobo assembly and extension member relative to a vehicle passing through the establishment.

In a second aspect, the light source assembly includes a light bulb for illuminating the gobo assembly.

In another aspect, the light source assembly includes a lens for focusing a light beam on the gobo assembly.

In another aspect, the gobo template image is formed by at least one of a through-hole and a transparent portion integrated into an opaque body of the gobo template In another aspect, the support mount is a wall mount affixed to the light source assembly.

In another aspect, the wall mount includes a bracket pivotally connected to the light source assembly such that the light source assembly is capable of pivoting in an up and a down direction.

In another aspect, the wall mount is a computer programmable motion mount having a controller configured to process a user input and command the light source assembly according to the user input to perform at least one of a group of: pivot up, pivot down, move right, move left, and rotate about a longitudinal axis of the light source assembly.

In another aspect, a control system is provided for controlling the motion of the programmable motion mount.

In another aspect, there is provided a user input device configured to receiver said user input.

In another aspect, the controller is configured to electronically change the image provided on said gobo template of said gobo assembly.

In another aspect, the support mount is a movable floor mount.

Introducing another embodiment, there is disclosed a message display system for projecting an image onto a windshield of a vehicle passing through a car washing establishment. The message display system generally includes a light source assembly, a gobo assembly including a gobo template comprising an image and a gobo template holder adapted to secure the gobo template within the gobo assembly, and an extension member. The extension member extends from the light source assembly and supports the gobo assembly at a predetermined distance from the light source assembly. A support mount is provided to position the gobo assembly relative to the vehicle. The message display system additionally includes an applicator for applying a material to a windshield of the vehicle.

In a second aspect, the message display system sprays the material onto the windshield of the vehicle and wherein the material is at least one of a wax or a soap.

Introducing a method of applying a message to a windshield of a vehicle passing through a car washing establishment the method generally includes the steps of providing a message display system having a light source assembly, a gobo assembly including a gobo template comprising a first image and a gobo template holder adapted to secure the gobo template within the gobo assembly, and an extension member extending from the light source assembly and supporting the gobo assembly at a predetermined distance from the light source assembly. The method further provides a support mount for positioning the gobo assembly relative to a vehicle and an applicator for applying a material to the windshield. The method further includes the steps of moving a vehicle into a predetermined position within the car washing establishment and applying the material to the windshield of the vehicle. The method still further includes the step of illuminating the material with a light beam passing through the gobo template to project the image onto the windshield.

In a second aspect of the method, the method further comprises the step of aiming the gobo assembly at the windshield.

In another aspect, the method further comprising a step of manually aiming said gobo assembly at said windshield.

In another aspect, the method further comprising a step of remotely aiming the gobo assembly at the windshield via a remotely located computer system and wherein the support mount includes a motorized motion mount.

In another aspect, the support mount is a floor movable mount and the step of aiming includes moving the floor mount around the vehicle.

In another aspect, the material is applied by spraying and wherein the material is at least one of a wax or a soap.

In another aspect, the method further comprises a step of manually changing the first image in the gobo assembly to a second image, wherein the second image is different from the first image.

In another aspect, the method further comprises a step of programmably changing the first image in the gobo assembly to a second image, wherein the second image is different from the first image.

In another aspect, the method further comprises the step of interpreting a customer's response to the image and acting on the response.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in a particular figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
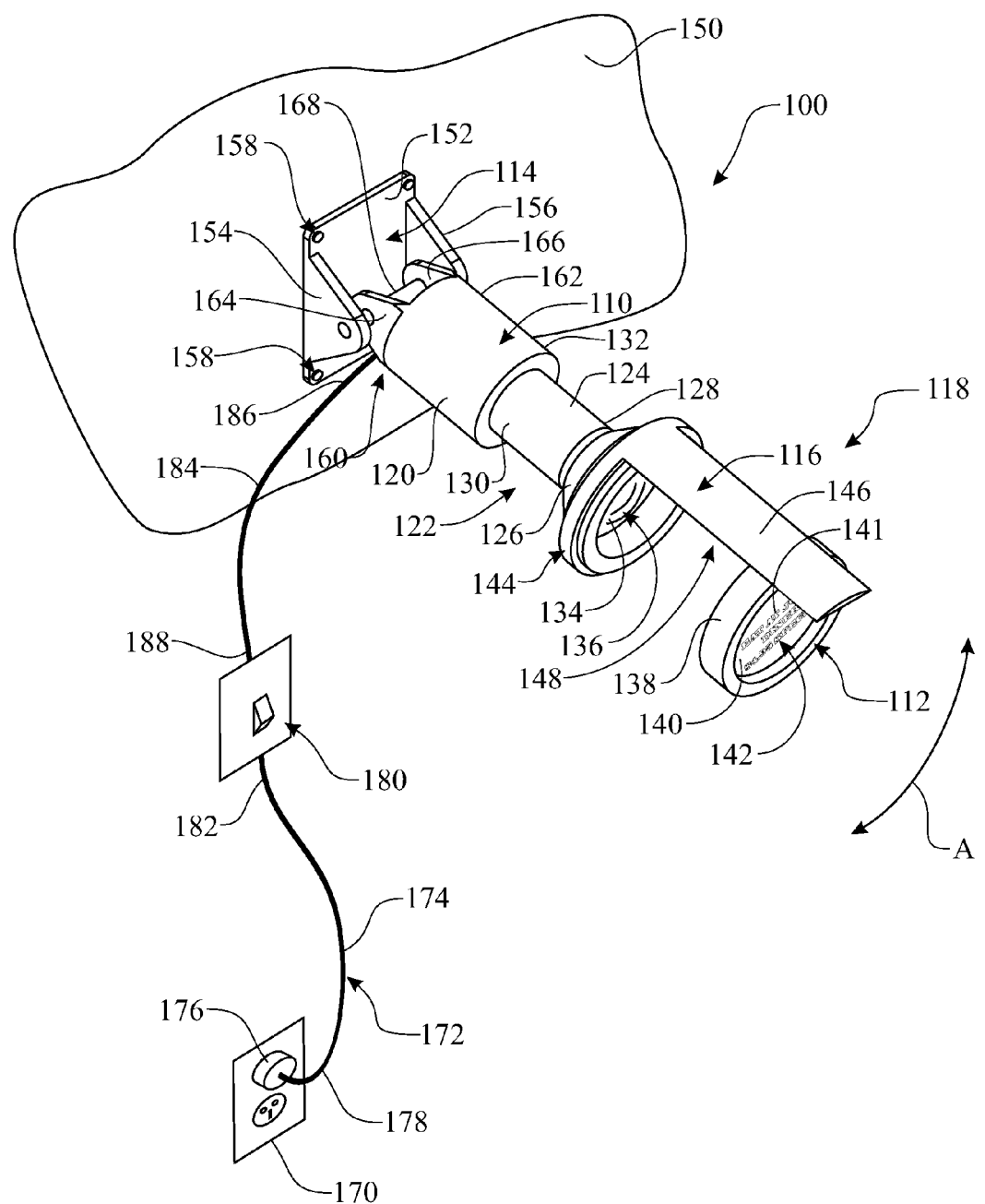
FIG. 1 presents a isometric view of one embodiment of a vehicle illuminating display device for use during an automotive cleaning procedure mounted to a wall.

Referring initially to FIG. 1, there is disclosed a vehicle illuminating display device 100 for use within a car washing establishment to communicate with a driver or occupant of a vehicle. The vehicle illuminating display device 100 generally includes a light source assembly 110, a message mount or "gobo" assembly 112 and a bracket or wall mount 114 for supporting the light source assembly 110 and the gobo assembly 112 relative to a vehicle (not shown). An extension member 116 is provided to support the gobo assembly 112 in front of the light source assembly 110 as described in more detail hereinbelow. The light source assembly 110, the gobo assembly 112 and the extension member 116 together form a communication device 118 for communicating messages from an operator or staff of a car washing establishment or the driver or operator of a vehicle passing through the establishment.

The light source assembly 110 includes a base member 120 and an illumination device 122 extending from the base member 120. The illumination device 122 may utilize various forms of illumination such as, for example Light Emitting Diodes (LED's), incandescent bulbs, infrared bulbs, etc. depending on the surface to be illuminated. In this embodiment, the illumination device 122 includes a shaft 124 and a conical bulb holder 126 mounted on a first end 128 of the shaft 124. A second end 130 of the shaft 124 is supported by, and mounted to, a first end 132 of the base member 120. An incandescent bulb 134 is provided within the conical bulb holder 126. A lens member 136 may be mounted on the conical bulb holder 126, in front of the incandescent bulb 134, to focus a light beam emanating from the illumination device 122 onto the gobo assembly 112.

The gobo assembly 112 is provided to hold images of material to be communicated to the driver of the vehicle. By way of definition, the word "gobo" in common parlance stands for a 'go between' or 'goes before optics' the meaning of which is related to the film industry. Typically, a 'gobo' is a template that has a particular shape designed to control the output from a light source. The 'gobo' is a mask situated in front of a light source either within a space integrated with the light source or located separately but adjacent thereto. In this fashion, the light emanating from the light source can be controlled by the shape, color and texture of the template or mask.

In this embodiment, the gobo assembly 112 generally includes a ring shaped holder 138 for holding or securing a gobo mask or template 142 within the device 100. The gobo template 142 can be in the form of a plate having a planar surface and including an opaque portion 140 of the plate, which blocks light, and one or more through-hole and/or transparent portions 141, which allow light to pass through. An image or message desired to be displayed to a user is defined by the shape, number, and design of the transparent portions 141 within the opaque portion 140, as is known in the art. The gobo template 142 may be removably mounted within the ring shaped holder 138 or may be fixed thereto. The masks 142 are chosen to display a thematic texture, color or image as well as provide a message to a user of the car washing system. It should be noted that the text or image of the message should be reversed, right to left, so that the text or image appears in the correct orientation when viewed through a windshield from within a vehicle.

As noted hereinabove, the extension member 116 is provided to support and maintain the gobo assembly 112 at a predetermined distance from the light source assembly 110 and, more specifically, from the incandescent bulb 134 of the light source assembly 110. This ensures proper passage of a beam of light through the through-holes or transparent portions 141 of the gobo template 142. The extension member 116 includes a support ring 144 mounted about the conical bulb holder 126 and an extension arm 146 extending from the support ring 144. In one embodiment, the ring shaped holder 138 of the gobo assembly 112 is affixed to an underside 148 of the extension arm 146. In an alternative embodiment, the gobo assembly 112 is movably mounted along the extension arm 146 using a slide mount (not shown). The use of a slide type mount, along with the lens member 136 of the illumination device 122, allows an operator to precisely focus a beam of light emanating from the illumination device 122 onto the gobo template 142 of the gobo assembly 112. This also allows the image projected onto the windshield to be enlarged or reduced as desired.

As shown, in this embodiment, the communication device 118 is attached to a wall 150 via the wall mount 114. The wall mount 114 includes a back plate 152 and a pair of triangular support arms 154 and 156 extending from the back plate 152. The back plate 152 is secured to the wall 150 by bolts 158. Alternatively, the back plate 152 may be secured to the wall 150 by the use of other types of fasteners, such as, for example screws, nails, etc. In order to attach the communication device 118 to the wall mount 114, the communication device 118 includes a support bracket 160 affixed to a second end 162 of the base member 120. The support bracket 160 also includes a pair of support arms 164 and 166 which fit between the support arms 154 and 156, respectively, of the wall mount 114. A through bolt 168 passes through, and frictionally engages, the support arm 154 and 156 of the wall mount 114 and the support arm 164 and 166 of the support bracket 160. This allows the communication device 118 to be pivoted up and down in the direction of arrow "A" relative to the wall 150 to aim the communication device 118 at a vehicle. The frictional engagement of the through bolt 168 holds the communication device 118 in the predetermined position.

Power for the communication device is provided by an electrical outlet 170. The vehicle illuminating display device 100 additionally includes a power cable assembly 172 having a first cable 174 terminating in a plug 176 at a first end 178 of the first cable 174. A switch 180 is provided on a second end 182 of the first cable 174. A second cable 184 connects the switch 180 to the communication device 118. Specifically, a first end 186 of the second cable 184 is attached to the base member 120 while a second end 188 of the second cable 184 is attached to the switch 180. By plugging the plug 176 into the outlet 170 and activating the switch 180, the incandescent bulb 134 of the illumination device 122 can be switch on and off.

Figure 2:
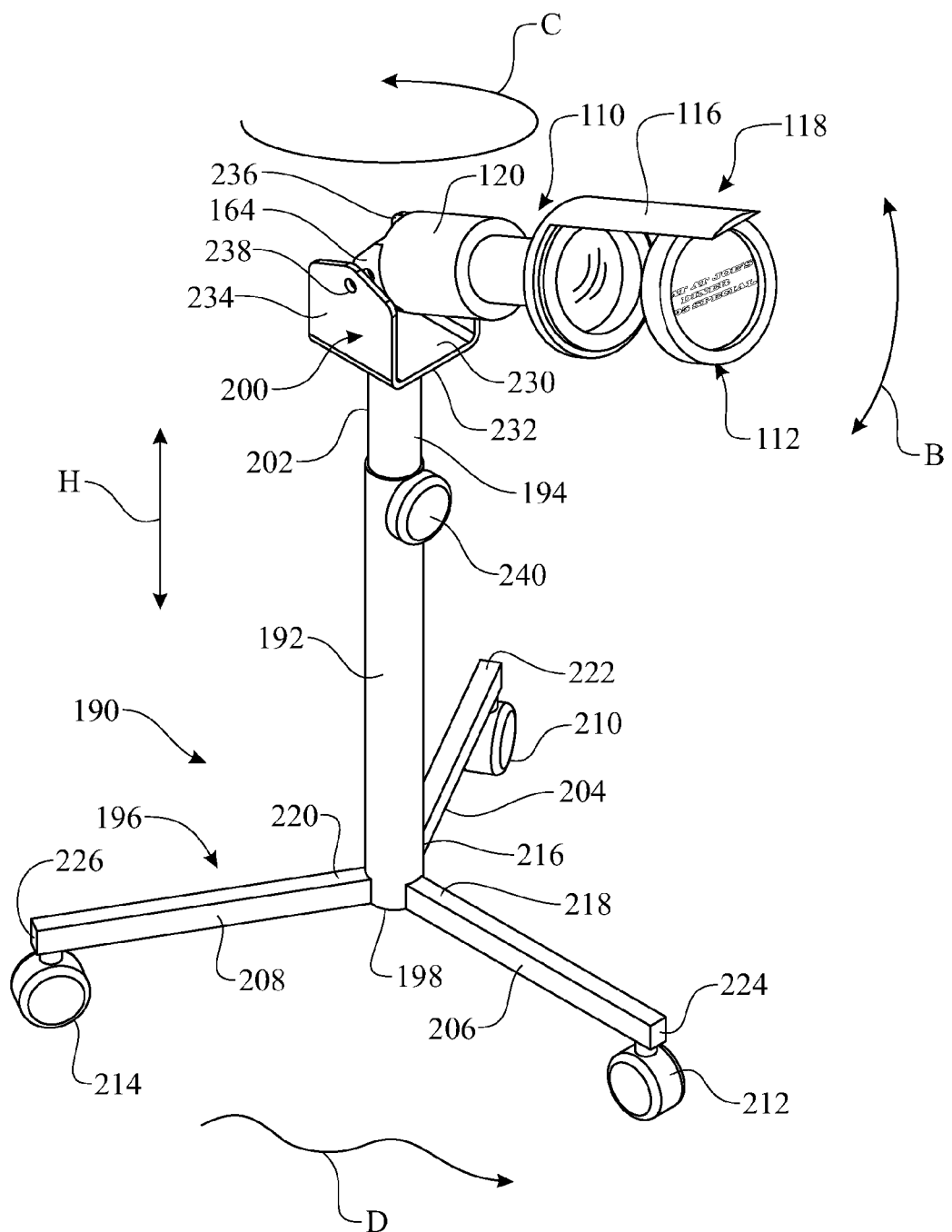
FIG. 2 presents a isometric view of the vehicle illuminating display device of FIG. 1 mounted on a movable floor stand.

Referring now to FIG. 2, there is disclosed an alternative mount or movable stand 190 for use with the communication device 118 of FIG. 1. The movable stand 190 replaces the wall mount 114 described hereinabove and generally includes a hollow support tube 192 and a support shaft 194 slidably mounted within the hollow support tube 192. A movable tripod or base assembly 196 is affixed to a bottom end 198 of the hollow support tube 192 and a mounting bracket 200 is affixed to a top end 202 of the support shaft 194. The movable stand 190 is provided to move and orient the communication device 118 around within a car wash establishment to better orient a beam emanating from the communication device 118 toward a windshield of a vehicle. Additionally, the movable mount 190 allows the communication device 118 to easily be positioned at various stations throughout the car wash establishment.

The movable base assembly 196 includes legs 204, 206 and 208 extending from the bottom end 198 of the hollow support tube 192 and terminate in wheels 210, 212 and 214. Specifically, respective first ends 216, 218 and 220 of legs 204, 206 and 208, respectively, are affixed to the hollow support tube 192 while the wheels 210, 212 and 214 are mounted in respective second ends 222, 224 and 226 of the legs 204, 206 and 208, respectively.

In order to support the communication device 118, the movable mount 190 further includes a mount bracket 200 similar to the wall mount 114 described in detail hereinabove. The mount bracket 200 includes a back plate 230. An underside 232 of the back plate 230 is affixed to the top end 202 of the support shaft 194 and includes a pair of support arms 234 and 236. The support arm 234 and 236 receive a through bolt 238 which frictionally engages the support arm 164 and 166 of the support bracket 160 of the communication device 118. This allows the communication device 118 to pivot up and down relative to the movable mount 190 and remain in position in a manner similar to that described hereinabove with respect to wall mount 114.

As shown, the mounting bracket 200 allows the light source assembly 110 to be moved up and down in the direction of arrow "B" while the positioning of the support shaft 194 within the hollow support tube 192 allows the light source assembly 110 to be rotated in the direction of arrow "C" about the shaft. Finally, as noted above, the movable stand 190 allows the light source assembly 110 to be moved to various locations about a car washing establishment, arrow "D".

Additionally, the movable mount 190 is height adjustable to better position the communication device 118 relative to a windshield of a vehicle. As noted above, the support shaft 194 is slidably mounted within the hollow support tube 192. By raising and lowering the support shaft 194 within the hollow support tube 192, the height "H" of the mount bracket 200, and thus the communication device 118, can be adjusted. A friction knob 240 is threaded through the hollow support tube 192 and is rotatable to frictionally engage and secure the support shaft 194 in a desired position within the hollow support tube 192.

Figure 3:
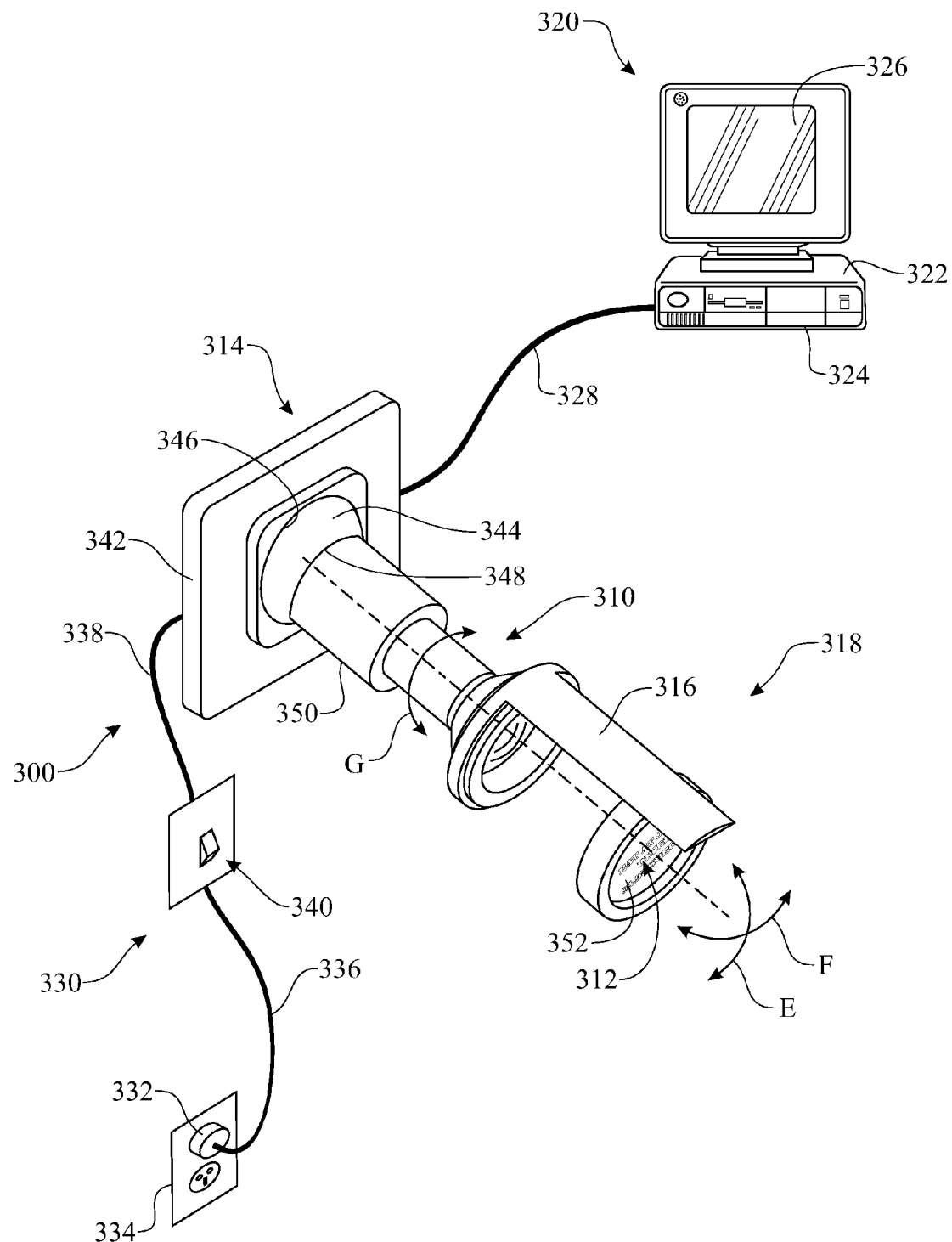
FIG. 3 presents a isometric view of an alternative embodiment of a vehicle illuminating display device including a motion mount.

Referring for the moment to FIG. 3, there is disclosed another embodiment of a vehicle illuminating display device 300 for use within a car washing establishment to communicate with a driver of a vehicle. Similar to the vehicle illuminating display device 100 described hereinabove, the vehicle illuminating display device 300 generally includes a light source assembly 310, a gobo assembly 312 and a wall mount 314 for supporting the light source assembly 310 and the gobo assembly 312 relative to a vehicle (not shown). An extension member 316 is also provided to support the gobo assembly 312 in front of the light source assembly 310 substantially as described with respect to the extension member 116 hereinabove.

Similar to that described hereinabove, the light source assembly 310, the gobo assembly 312 and the extension member 316 together form a communication device 318 for communicating messages from an operator or staff of a car washing establishment or the driver or operator of a vehicle passing through the establishment. The light source assembly 310 and the extension member 316 are substantially identical to the light source assembly 110 and the extension member 116 described hereinabove.

In this embodiment, the wall mount 314 is movable to remotely aim, via a remotely located computer system, for example, the light source assembly 310 at a vehicle passing through the car wash establishment or at various stations within the car wash establishment. Additionally, by remotely moving wall mount 314, the light source assembly can be aimed at the windshields of vehicles having different heights.

The vehicle illuminating display device 300 additionally includes a control system 320 having a computer or controller 322 for processing user input commands for moving the wall mount 314; a key board, a mouse, a joystick, or terminal 324 for allowing a user to input instructions into the controller 322; and a monitor 326 for displaying and viewing the inputted instructions. A cable bundle 328 connects the control system 320 to the movable wall mount 314. Similar to the vehicle illuminating display device 100 above, the vehicle illuminating display device 300 additionally includes a power cable assembly 330 having a plug 332 for insertion into an electrical outlet 334, first and second cables 336 and 338, respectively, and a switch 340 for turning on and off the base power to the vehicle illuminating display device 300. Alternatively, the power may be controlled directly from the control system 320.

In this embodiment, the wall mount 314 includes a motor box 342 having a movable ball or "gimbal" 344 extending through an opening 346 in the motor box 342. A second end 348 of a base member 350 of the light source assembly 310 is affixed to the gimbal 344. Thus, data input into the control system 320 causes the motor box 342 to move the gimbal 344 up and down in the direction of arrow "E", right and left in the direction of arrow "F" and rotational motion in the direction of arrow "G", or any combination of same. This, in turn, moves the communication device 318 in response to the input instructions thereby remotely aiming the light source assembly 310 at various locations within the car wash establishment.

The gobo assembly 312 may be substantially identical to the gobo assembly 112 described hereinabove. Alternatively, the gobo assembly 312 may include a dynamic screen or plate 352 which can replicate data, instructions, logos or images input into the control system 320. To accomplish this, the plate 352 may be formed from an opaque material having responsive structure imbedded or otherwise incorporated into the structure of the plate 352. For example, the plate 352 may be formed from a transparent or semi-transparent substrate with a selectively opaque LED structure array imbedded or applied to the plate 352. Absent electrical input from the control system 320 the entire plate 352 passes the light rays. By activating certain elements of the LED array, specific areas of the light rays are blocked or visa versa to create a programmable, dynamically alterable, image projected from the vehicle illuminating display device. The images thus projected can be static or motion and streamed from the control system 320 to present cleaning options, static or movable commercials or advertisements, etc. Alternate structure for the plate 352 may include plasma, thermally responsive plates, or other transparent plates locally responsive to inputs from the control system 320.

Figure 4:
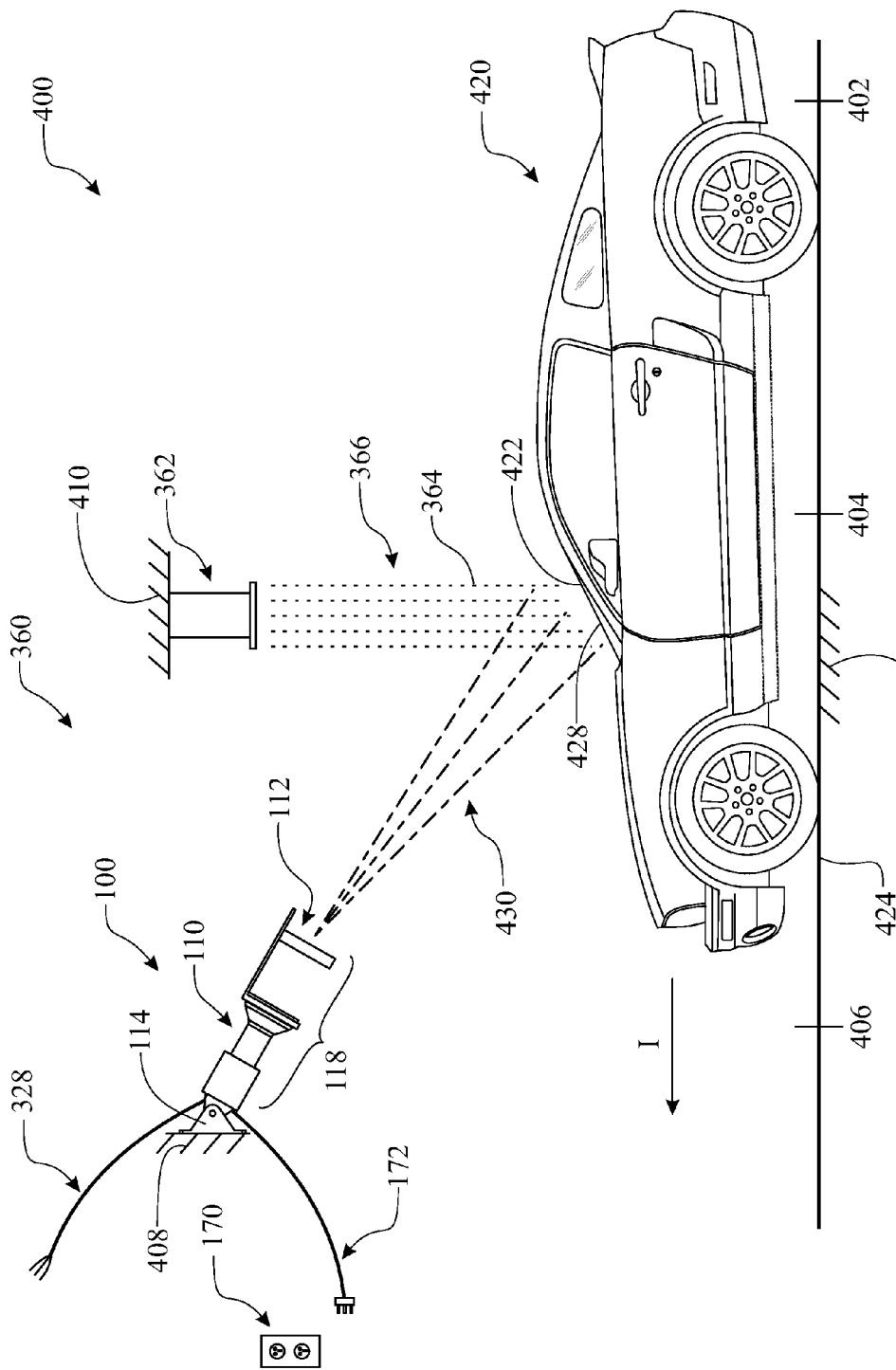
FIG. 4 presents a system of projecting an image onto a windshield of a car including the vehicle illuminating display device of FIG. 1 and a substance applicator.
Figure 5:
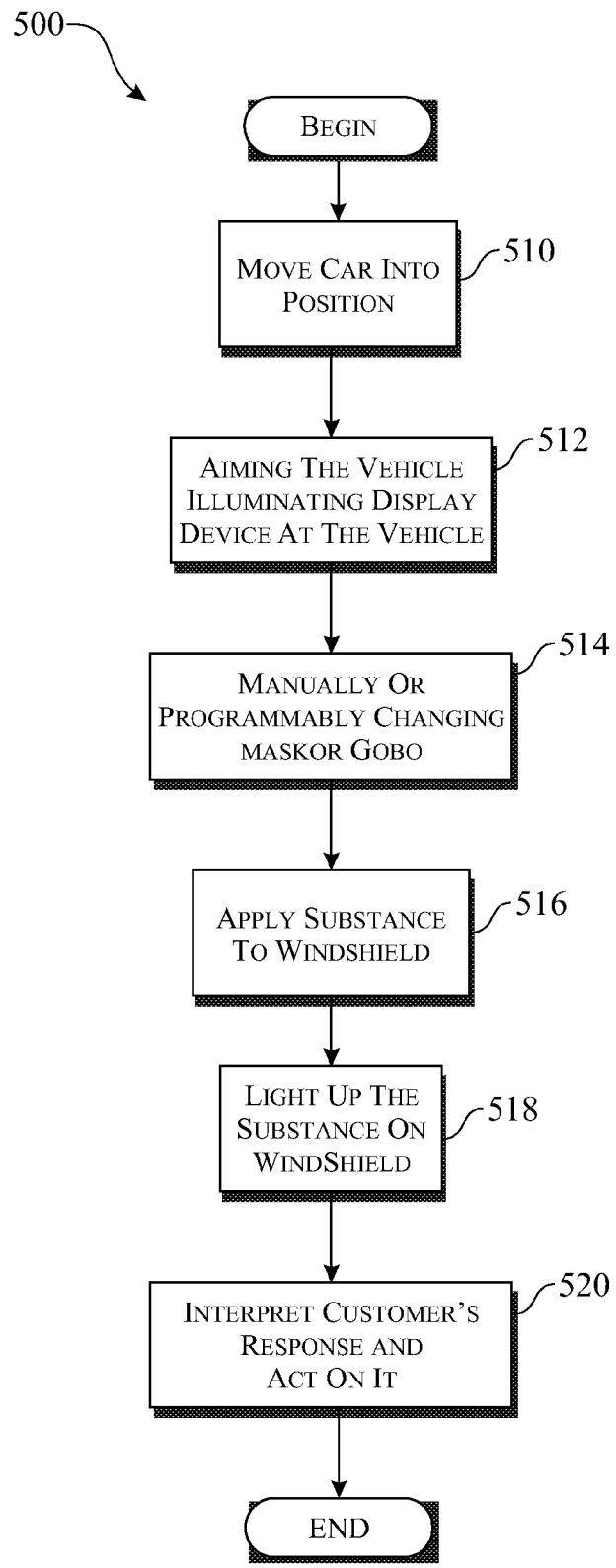
FIG. 5 presents a flow chart describing a method of projecting an image onto the windshield of the vehicle utilizing the vehicle illuminating display device of FIG. 1.
Figure 6:
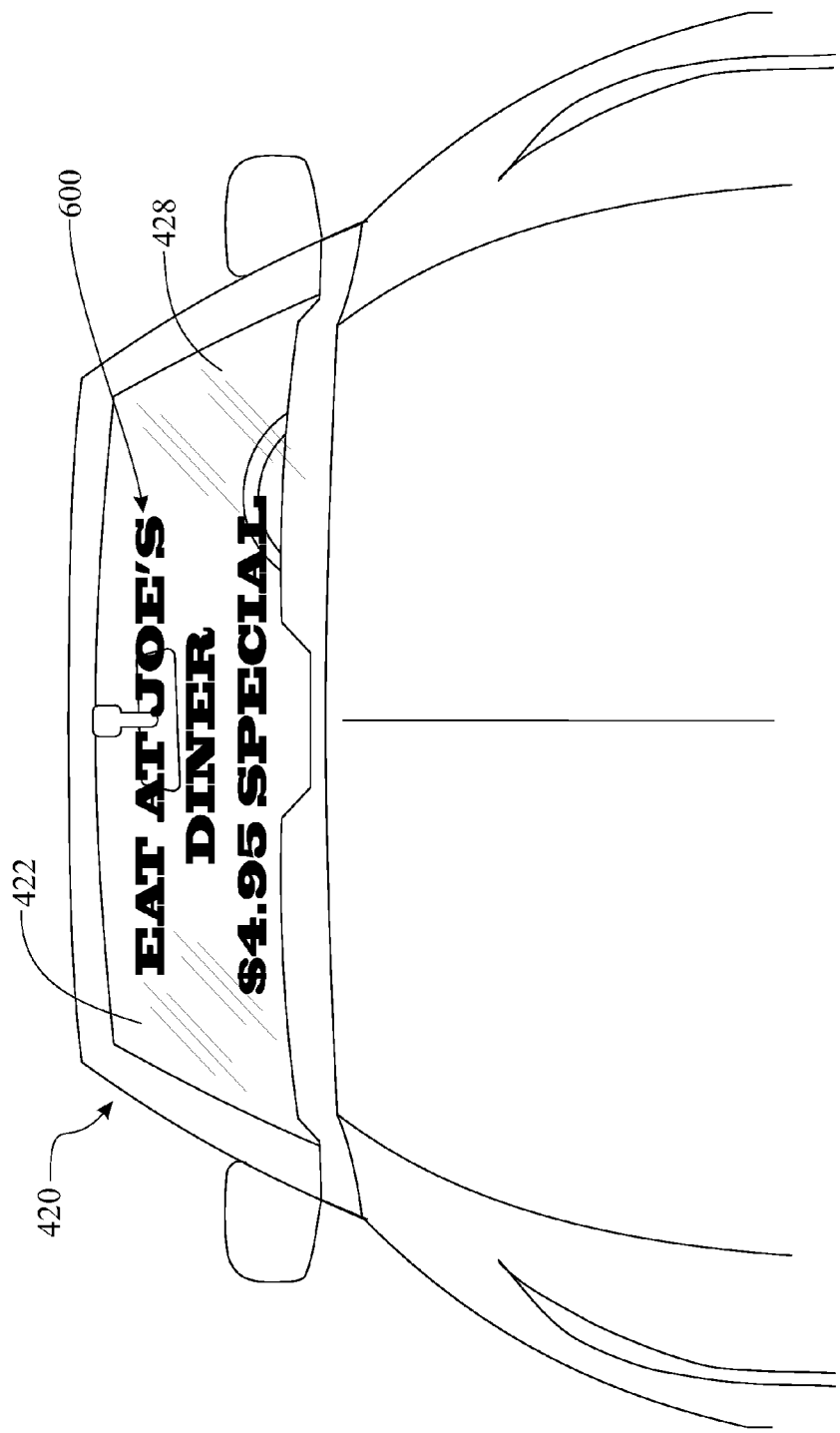
FIG. 6 presents a front, elevation view of the image projected by the vehicle illuminating display device of FIG. 1 onto the windshield that is covered with soap and water.

With reference now to FIGS. 4-6, and initially with regard to FIG. 4, the use of the vehicle illuminating display device 100 will now be described. The vehicle illuminating display device 100 forms part of an overall message display system 360 for projecting images onto a windshield of a vehicle as discussed below. The message display system additionally includes an application device 362 which is provided to send a reflective or absorptive material 364 toward the vehicle in the form of a spray. The material 364 can be a car washing foam or wax application of the type typically applied during car washing procedures.

The application device 362 can be wall or floor mounted. The application device 362 may be stationary but is preferably moveable through the use of electro-mechanical mechanisms that can translate the application device 362 in two and preferably in three dimensions (similar to that of the wall mount 314 described hereinabove) so as to service almost any vehicle. The effect of the light source assembly 110 in sending beams of light through the gobo assembly 112 mask or template is to project an image upon the surface of the windshield as described below. Specifically, as the material 364, in the form of a wax or foam, is being applied to the surface of the vehicle, the actual result is to display an image upon these substances as applied.

As previously noted, the message display system 360 is provided for use in a car washing establishment 400 having one or more treatment stations, such as, for example, a first, a second and/or a third station, 402,404 and/or 406, respectively. The vehicle illuminating display device 100 is mounted on a wall 408 of the establishment 400 while the application device 362 is mounted to a ceiling 410 of the establishment. Alternatively, both or either of the vehicle illuminating display device 110 and the application device 362 may be floor, wall or ceiling mounted either statically or movably.

The car washing establishment 400 is designed to receive a vehicle 420, having a windshield 422, and move or allow the operator to drive the vehicle 420 in the direction of arrow "I" past the various stations for wetting, cleaning, waxing, drying, etc. The vehicle 420 moves along or is moved by a track or conveyor 424 provided in a floor 426 of the establishment 400.

Referring now to FIG. 5, there is presents a flow chart 500 showing the steps involved in conducting the process involved in operating the car washing establishment 400 including the use of the message display system 360 during cleansing of the vehicle 420 to communicate a message to a customer via the windshield 422 of the customer's car.

In the most basic form of the disclosed method, in the first step 510 of the process the vehicle 420 is moved into position at one of the stations 402-406 either through an automated conveyor type car wash utilizing the conveyor 424 or through a user driving the vehicle 420 to the intended station. Next, in the second step 512, the vehicle illuminating display device 100 is aimed, either manually or by remote control, at a particular station 402-406 or at the windshield 422 of a specific vehicle 420. In a third step 514, the mask 142 of the gobo assembly 112 is changed either manually or remotely to convey different or continuing messages or images to the operator of the vehicle 420. In a fourth step 516, a foreign substance in the form of material 364 is applied to the windshield 422 of the vehicle 420 using application device 362. Specifically, the application device 362 projects the material 364, typically, a foaming wax, soap or other chemical, by spray 366. The material 364 may be sprayed or poured onto the surface of the windshield 422. This applied material 428 in the form of foreign substance (foam, wax, soap or chemical) or material 364 provides a convenient reflective or absorptive surface which allows projected light rays 430 to be seen on the windshield 422 by the customer.

Thereafter, in a fifth step 518, the vehicle illuminating display device 100 is activated to project light through gobo assembly 112 to generate the projecting light rays 430 thus illuminating the applied material 428 as it covers a portion or all of the targeted vehicle windshield 422. As noted hereinabove, the customer may be provided an opportunity to signal answers to questions or options provided by the projected images by flashing headlights, signaling with a horn, etc. Therefore, a further or sixth step 520 may include the step of the customer responding to the question or option and the operator of the establishment 400 acting on the customer's response.

It should be noted that, while the steps disclosed in the flow chart of FIG. 5 appear or are lined up in a specific order, it is contemplated that the steps may be performed in any logical order to convey an image onto the applied material 428 on the windshield 422. Also, two or more blocks shown in succession may be executed concurrently or with partial concurrence. Certain blocks may also be omitted for the sake of brevity. And some blocks are merely exemplary steps in an exemplary implementation, but are not required in order to be in accordance with the present invention.

As best shown in FIG. 6, the end result of the use of the vehicle illuminating display device in the message display system 360 is an image 600 projected onto the windshield 422 of a vehicle 420. It should be noted that the image 600 is shown in the correct orientation for the reader of this disclosure. In fact, in actual use and application, the image would be reversed so that the driver of the vehicle 420 could read it properly from within the vehicle 420.

While not specifically illustrated, it is contemplated that an optional embodiment may include the step of positioning a photoelectric sensor and electro-mechanically driven arm of the type typically used in car washes to position cleaning devices nearby the surface to be cleaned. The disclosed gobos and light sources are optionally mounted on such an electro-mechanically driven arm so as to precisely position the gobos and light source over the windshield area of the vehicle. The photoelectric sensor then detects the location of the car's windshield and actuates the servo mechanisms of the electro-mechanically driven arm to position the light source and gobo in the appropriate position to display the desire messages. The robotic arm can have as many or as few joints as possible similar to what is currently available in the car washing field or for a more involved solution similar to what was found in the late space shuttle technologies.

In this manner, the disclosed vehicle illuminating display systems allow the operator of a car washing establishment to present messages and pose questions to the driver of a vehicle passing through the establishment. More importantly, the disclosed vehicle illuminating display systems, in conjunction with the disclosed application device in the message display system, permit the driver of the vehicle to easily and clearly perceive such messages through their windshield while it is covered with cleaning fluids, foams or waxes.

The above-described embodiments are merely exemplary illustrations of implementations set forth for a clear understanding of the principles of the invention. Many variations, combinations, modifications or equivalents may be substituted for elements thereof without departing from the scope of the invention. For example, while the above disclosure is directed toward an image formed on the windshield, it is obvious that any window of the vehicle can be similarly treated. Therefore, it is intended that the invention not be limited to the particular embodiments disclosed as the best mode contemplated for carrying out this invention, but that the invention will include all the embodiments falling within the scope of the appended claims.

What is claimed is:

1. A method of applying a message to the windshield of a vehicle passing through a car washing establishment comprising steps of:
   providing a message display system including:
      a light source assembly;
      a gobo assembly including a gobo template comprising a first image and a gobo template holder adapted to secure said gobo template within said gobo assembly;
      an extension member extending from said light source assembly and supporting said gobo assembly at a predetermined distance from said light source assembly;
      a support mount for positioning said gobo assembly relative to a vehicle; and
      an applicator for applying a material to a windshield of a vehicle;
   moving a vehicle into a predetermined position within said car washing establishment;
   applying said material to said windshield of said vehicle; and
   illuminating said material with a light beam passing through said gobo template to project said image onto said windshield.

2. The method as recited in claim 1, further comprising a step of aiming said gobo assembly at said windshield.

3. The method as recited in claim 1, further comprising a step of manually aiming said gobo assembly at said windshield.

4. The method as recited in claim 1, further comprising a step of remotely aiming said gobo assembly at said windshield via a remotely located computer system and wherein said support mount includes a motorized motion mount.

5. The method as recited in claim 2, wherein said support mount is a floor movable mount and the step of aiming includes moving said floor mount around said vehicle.

6. The method as recited in claim 1, wherein said material is applied to said windshield by spraying and wherein said material is at least one of a wax or a soap.

7. The method as recited in claim 1, further comprising a step of manually changing said first image in said gobo assembly to a second image, wherein said second image is different from said first image.

8. The method as recited in claim 1, further comprising a step of programmably changing said first image in said gobo assembly to a second image, wherein said second image is different from said first image.

9. The method as recited in claim 1, further comprising a step of interpreting a customer's response to said first image and acting on such response.

* * * * *